United States Patent [19]

Foster

[11] 4,390,300
[45] Jun. 28, 1983

[54] ADJUSTABLE BICYCLE HANDLEBAR STEM

[76] Inventor: Edwin E. Foster, 1801 Camp Craft Rd., Austin, Tex. 78746

[21] Appl. No.: 179,940

[22] Filed: Aug. 21, 1980

[51] Int. Cl.³ .............................................. B62K 21/22
[52] U.S. Cl. ..................................... 403/24; 403/108; 280/279
[58] Field of Search .............. 403/108, 330, 322, 327, 403/374, 24; 74/493, 551.3, 551.6, 551.7, 529, 551.1; 280/278, 279

[56] References Cited

U.S. PATENT DOCUMENTS

| 612,989 | 10/1898 | Hunter et al. | 280/279 X |
|---|---|---|---|
| 2,987,936 | 6/1961 | Selle et al. | 74/493 |
| 3,306,127 | 2/1967 | Rieger | 74/493 |
| 3,491,663 | 1/1970 | Morgan | 74/493 |
| 4,167,352 | 9/1979 | Pletscher | 403/374 X |
| 4,260,171 | 4/1981 | Foster | 403/108 X |

FOREIGN PATENT DOCUMENTS

| 203007 | 6/1939 | Switzerland | 74/551.3 |
|---|---|---|---|
| 9124 | of 1896 | United Kingdom | 280/278 |

Primary Examiner—Andrew V. Kundrat
Attorney, Agent, or Firm—Kalish & Gilster

[57] ABSTRACT

A system for vertically adjusting bicycle handlebars comprising a handlebar-carrying, tubular stem slidably receivable within the front fork tube of a bicycle which latter internally is provided with a stationary tube for disposition between the stem and the front fork tube. There is a vertically presented lever within the stem and adapted for swingable movement intermediate its length by means of a transverse pivot pin; there being a latching pin at the lower end of said lever for selected locking reception within openings formed in stationary tube. A pull link having a control knob externally of the stem is secured to the upper end of the lever to control the movement of the latter.

7 Claims, 11 Drawing Figures

U.S. Patent Jun. 28, 1983 Sheet 1 of 3 4,390,300
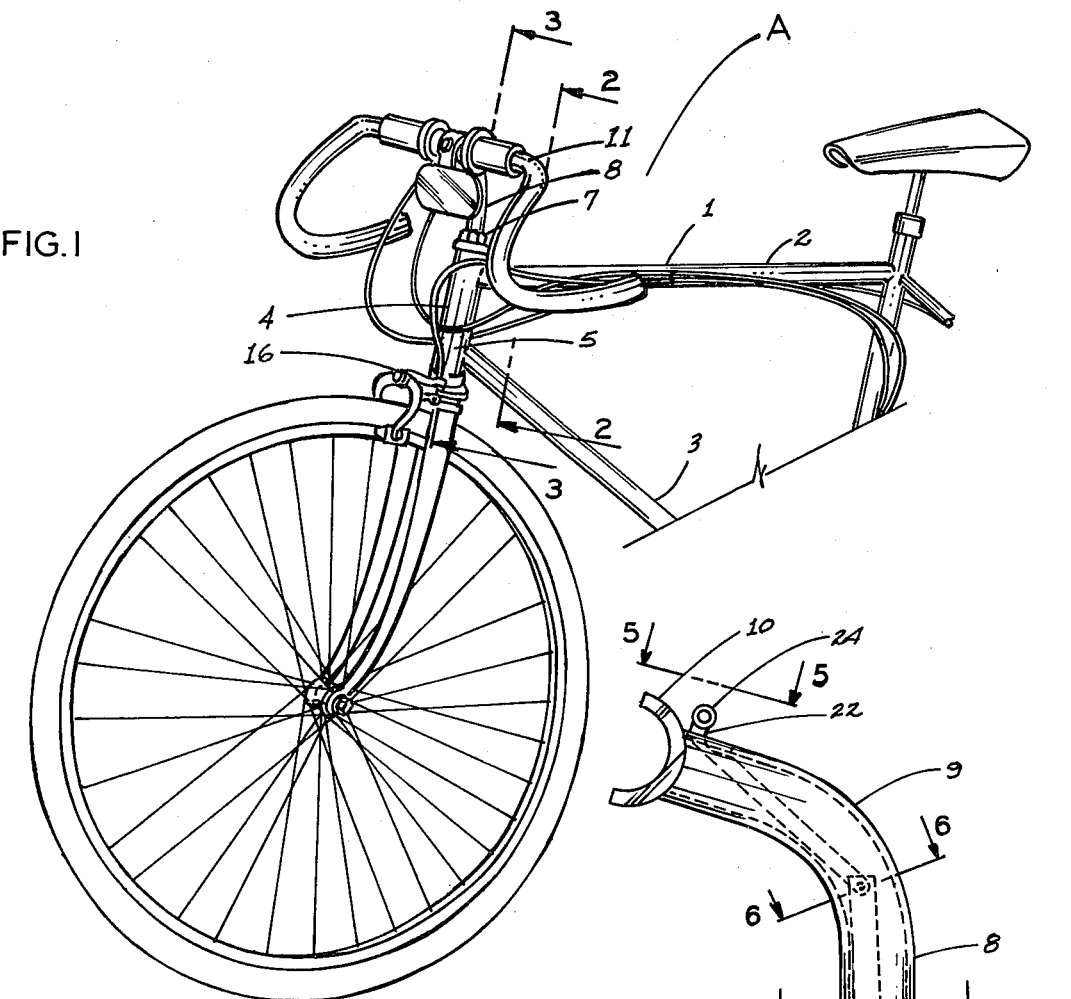
FIG.1
FIG.2
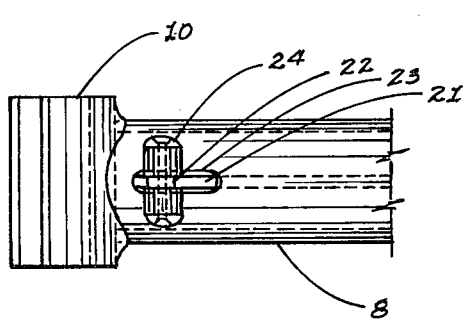
FIG.5

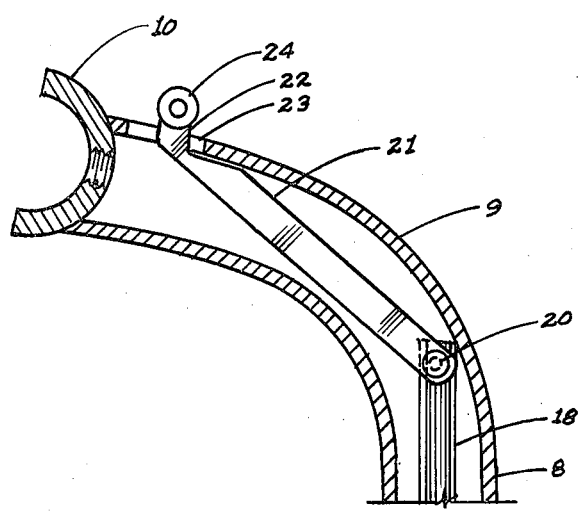
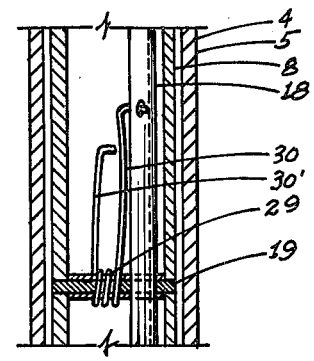
FIG. 9
FIG. 4
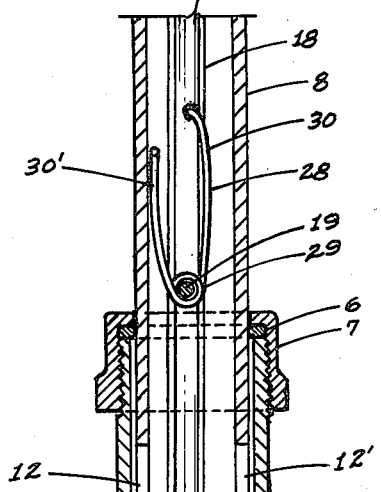
FIG. 10
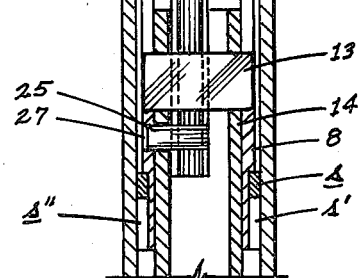
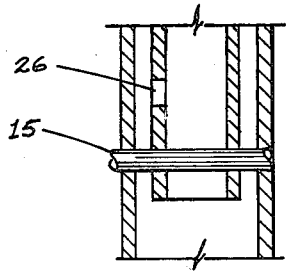
FIG. 11

ADJUSTABLE BICYCLE HANDLEBAR STEM

BACKGROUND AND SUMMARY OF THE INVENTION

This invention relates, in general, to bicycles, and, more particularly, to a system for adjusting the vertical height of the handlebars. Heretofore, the method of vertically adjusting the handlebars of a bicycle has been a rather cumbersome and time consuming operation and one which has consistently required the operator to be in a dismounted state to bring about the necessary adjustment. Most generally, the methods for altering the height of the handlebars have involved the use of appropriate tools in order to bring about a loosening of cooperating threaded elements in order to free the support or stem for shifting into desired position and then a corresponding tightening operation.

In more recent years, efforts have been considered to effect this type of adjustability without requiring the operator to resort to tools which, on many critical occasions, are unavailable. It has been extremely desirable to provide a system which would permit adjusting the height of the handlebars but would not require the rider to dismount. An early effort is illustrated by British patent specification No. 9124, Apr. 1896; and a more recent effort is shown in Swiss Pat. No. 203007, June 1939. Another particular effort along these lines is set forth in the applicant's co-pending application, Ser. No. 1,443, filed Jan. 8, 1979 and now U.S. Pat. No. 4,260,171 in an invention entitled "Bicycle Gear Shift System." However, these prior efforts have not proved efficacious in practice. They inordinately are devoid of a desired simplicity of construction which would render same highly durable and reliable in operation as well as economical in production and it is apparent that such prior constructions did not possess that degree of positive lockability in the particular preselcted position to accord the operator a full sense of security.

Therefore, it is an object of the pesent invention to provide a system for adjusting the handlebars of a bicycle which comprehends a paucity of components which are durable and resistant to breakdown.

It is another object of the present invention to provide means for adjusting the height of the bicycle handlebars which is controlled by the simple to and fro shifting of a conveniently located control knob, the operation of which does not enhance the rider's peril in view of its facile movement and location.

A still further object of the invention is to provide a system for adjusting handlebars as stated which entails a positive interlock between movable and stationary components so that reliability is accorded and thereby relieving the rider of any concern as to the possibility of accidental travel of the handlebars from chosen position.

It is another object of the present invention to provide a system for adjusting bicycle handlebars which may be easily installed upon existing bicycles without requiring any costly or damaging modification thereof.

The present invention thus contemplates a handlebar-carrying stem which latter is vertically movable within the front fork tube of a bicycle and which stem internally pivotally mounts a lever carrying a latching pin for reception within a selected opening in a stationary element within the tube.

DESCRIPTION OF THE DRAWINGS

FIG. 1 is a fragmentary perspective view of a bicycle having mounted thereon adjustable handlebars constructed in accordance with and embodying the present invention.

FIG. 2 is a vertical view taken on the line 2—2 of FIG. 1.

FIG. 4 is a vertical transverse sectional view taken substantially on line 3—3 of FIG. 1 but illustrating the handlebars in elevated position.

FIG. 5 is a fragmentary top plan view taken on line 5—5 of FIG. 2.

FIG. 9 is a vertical view taken partially in section on the line 9—9 of FIG. 3.

FIG. 10 is a horizontal transverse sectional view taken on line 10—10 of FIG. 2.

FIG. 11 is a horizontal transverse sectional view taken on line 11—11 of FIG. 2.

DESCRIPTION OF THE PREFERRED EMBODIMENT

Figure 3:
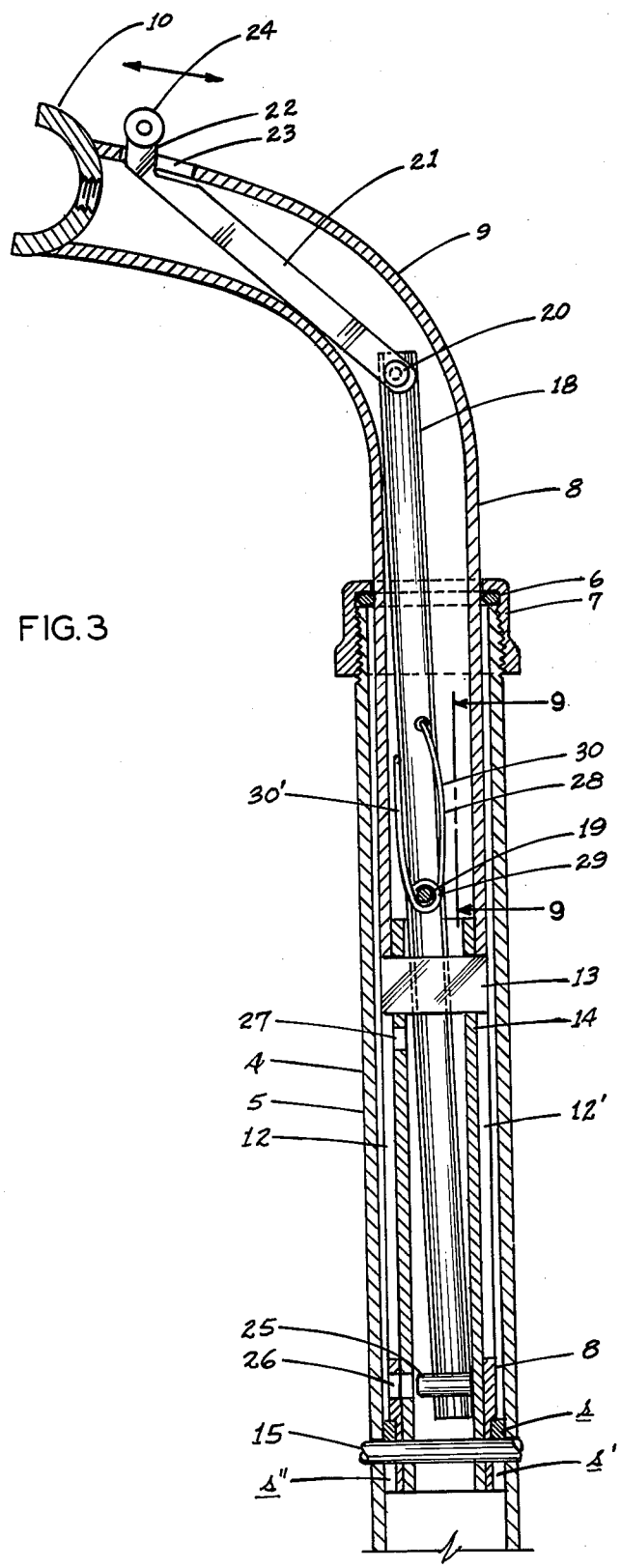
FIG. 3 is a transverse vertical sectional view taken on line 3—3 of FIG. 1 illustrating the handlebar stem in lowered position.
Figure 6:
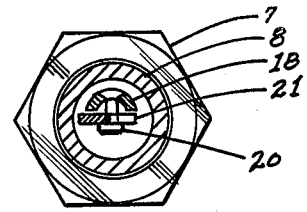
FIG. 6 is a horizontal transverse sectional view taken on line 6—6 of FIG. 2.
Figure 7:
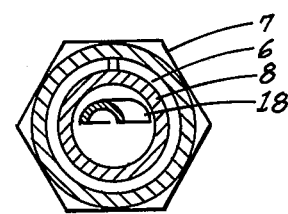
FIG. 7 is a horizontal transverse sectional view taken on line 7—7 of FIG. 2.
Figure 8:
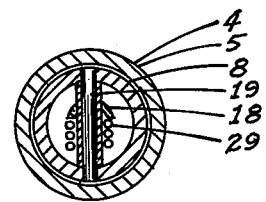
FIG. 8 is a horizontal transverse sectional view taken on line 8—8 of FIG. 2.

Referring now by reference characters to the drawings which illustrate the preferred embodiment of the present invention A designates a bicycle incorporating the customary frame 1 with the usual cross bar 2 and front diagonal bar 3 which latter at their forward ends are integral with the post or fork tube 4 of a front fork 5; there being a resilient ring 6, as of nylon, provided at the upper end of said fork tube 4 which is received within a cap nut 7 adapted to thredly engaging the upper end of said tube 4. Provided for relative vertical movement within tube 4 is a tubular stem 8 projecting at its upper end portion above the upper end of tube 4 and spacedly therefrom being forwardly curved or turned, as at 9. Said tube 4 at its upper forward end integrally carries the forwardly opening rearward component 10 of a sleeve (not shown) for receiving and engaging the central portion of handlebars, as indicated generally at 11 in FIG. 1. Said stem 8 in its vertical portion is thus coaxially with fork tube 4. Said stem spacedly downwardly of the upper end of tube 4 is provided with a pair of diametrically aligned elongated vertically extending slots 12, 12', respectively, for relative movement therethrough of a flat, transversely extending key 13 which is fixed in the upper end portion of a stationary tube 14 also coaxially with tube 4 and located inwardly of stem 8; the upper end of stationary tube 14 terminating spacedly downwardly of the upper end of said tube 4. Fixed on the lower end of stem 8 is a lower guide bushing s having diametrically opposed downwardly opening recesses s', s" for straddling shaft 15 of brake 16 when the handlebars are in the lower position (FIG. 3) and as said handlebars are elevated bushing s serves as an aligning guide. In its lower end portion stationary tube 14 is fixed to fork tube 4 by means of the shaft of a calipher brake 16 engageable with bicycle front wheel 17; said shaft 15 extending through aligned openings in said tube 14 and fork tube 4. Thus, tube 14 is fixed against undesired vertical shifting. As will be developed more fully hereinbelow, said stem 8 is restrained against undesired rotative movement about its longitudinal axis by reason of key 13 moving within the restraining slots 12, 12' during vertical movement of said stem 8.

Provided within stem 8 is a vertically extending elongated link or lever 18 which may be rounded in cross-section for enhancing the strength thereof without resort to heavier stock. Said lever 18 is pivoted within its intermediate portion upon a pin 19 fixed at its ends within diametrically aligned openings in stem 8 (See FIGS. 9 and 10) whereby said lever is rockable about the axis of pin 19. The upper end of lever 18 terminates within stem 8 within the lower portion of the forwardly curved section, as at 9, and thereat is swingably connected by a pin 20 to a pull link 21 which progresses forwardly through the upper curved portion of stem 8 and at its forward extremity is contoured to provide a vertical boss 22 which projects upwardly through a slot-like aperture 23 formed in the upper wall portion of stem 8 adjacent component 10; there being a small control knob 24 carried upon the projecting end of boss 22 for facilitating manipulation of link 21 for purposes presently appearing.

In its lower end portion, immediately upwardly of its lower end extremity, lever 18 carries a locking pin 25 which is transversely disposed and at its forward end projects beyond the adjacent edge of said lever 18 being presented for optional latching acceptance within a lower and an upper opening 26, 27, respectively, formed in the wall of stationary tube 14 for purposes presently to be developed.

Provided for retaining lever 18 in preselected disposition with respect to locking pin 19 is a spring 28 as of the general safety pin type being broadly of U-shaped character having substantially central coils turned about said pin 19, as at 29, (See FIG. 9) with legs 30, 30' extending upwardly; said former being suitably affixed to lever 18 and the latter bearing in its upper extremity against the inner face of stem 8. It will accordingly be seen that spring 28 will serve to reliably prejudice lever 18 into its locked conditions.

In view of the foregoing, the operation of the present invention should be readily apparent. It will be observed that control knob 24 is so disposed as to be conveniently manipulated by the rider without danger of his becoming distracted so as to provoke a condition of peril. With control knob 24 in its forward position, as may be best seen in FIG. 3, lever 18 will be pulled forwardly, as it were, at its upper end thereby being rocked about pivot pin 19 so that the lower end of lever 18 abuts against the inner face of the back wall portion of the bore of stationary tube 14 whereby locking pin 25 will be in disengaged state with respect to the proximate opening, 26, 27, as the case may be. Thus, in this condition stem 8 is free to move relatively vertically within fork tube 4, that is, upwardly or downwardly depending upon the initial position thereof. By reason of nylon ring 6 damaging counteract between stem 8 and fork tube 4, as by scraping or the like, is inhibited.

As shown in FIG. 4, control knob 24 will normally be in a rearward portion of aperture 23 as spring 28 is of sufficient strength and bias to urge lever 18 into locked condition, that is, with pin 25 being latchingly received in the selected opening 26 or 27, as the case may be.

Therefore, to unlock stem 8 to allow for adjusting handlebars 11 of bicycle A into a comfortable vertical position for the rider, the latter need merely cause control knob 24 to be moved forwardly, with stressing of spring 28 whereby lever 18 is disposed into unlocked condition (See FIG. 3) and thereby permits stem 8 to be freed for vertical shiftable movement through merely pulling upwardly or pushing downwardly as desired for the intented adjustment. If the former, such upward travel is terminated by spring 28 causing locking pin 25 to become engaged within upper latching opening 27 as by snapping thereinto. If the latter, then stem 8 is pushed downwardly until locking pin 25 is similarly received within opening 26 under influence of spring 28. Such action, will, understandably, cause knob 24 to be restored to the rearward portion of opening 23 (FIG. 4). The present invention is easily operated for permitting appropriate adjustment of the handlebars into a comfortable position. The cyclist need not leave the bicycle seat to bring about such adjustment as it is one which is quite rapidly achieved without the applicaion of undue force and without the necessity of resort to extrinsic tools. Furthermore, the locking of stem 8 in its particular position is of a most positive nature and markedly enhanced by the novel spring 28 so that one may operate the bicycle with a sense of assurance that the handlebars will not accidentally and unauthorizedly shift.

The present invention may be easily provided on existing bicycles without requiring costly modification thereof and without any danger to, or weakening of, the bicycle frame.

What is claimed:

1. In a bicycle having a handlebar and a frame with a front fork tube, the improvement comprising a stem with its lower portion in said fork tube within which tube said stem is slidable, said stem having an upper portion extending above said fork tube and projecting forwardly thereof, means securing said handlebar to said stem upper portion on the forward end portion thereof, a stationary tube provided within said fork tube, means fixing said stationary tube to said fork tube for preventing relative movement of the former, said stationary tube being disposed coaxially with, and interiorly of, said stem lower portion, a lever disposed within said stem, means pivotally mounting said lever for rockable movement about an axis transverse to said stem, a latching pin carried on said lever, and at least one latch opening provided in said stationary tube for accepting said latch pin for maintaining said stem in preselected vertical relationship to said fork tube, said lever being thereby rockable between latch pin locked and unlocked condition.

2. The improvement as defiined in claim 1 and further characterized by resilient means urging said lever into locked condition.

3. The improvement as defined in claim 2 wherein first and second vertically spaced apart latch openings are provided in said stationary tube, and means for vertically shifting said stem between said latch openings for selected locking therein of said latch pin.

4. The improvement as defined in claim 3 and further characterized by cooperative guide means for preventing axially rotative movement of said stem.

5. The improvement as defined in claim 4 and further characterized by said means for preventing axially rotative movement of said stem comprising elongated, diametrically opposed openings in said stem, and a key fixed on said stationary tube and projecting into said elongated openings for relative movement therein during vertical travel of said stem.

6. The improvement as defined in claim 3 wherein said means for vertically shifting said stem comprises a pull link pivotally engaged to the upper end portion of said stem, and a control element carried on said pull link and being accessible exteriorly of said stem.

7. The improvement as defined in claim 6 wherein the stem adjacent its forward extremity contains a slot-like aperture, and the forward end portion of said pull link together with said control element project through said slot-like opening for movement therealong for effecting raising and lowering of said lever and said stem.

* * * * *